United States Patent [19]

Sick et al.

[11] Patent Number: 5,131,356
[45] Date of Patent: Jul. 21, 1992

[54] SINGLE CYLINDER OR MULTICYLINDER BLOCK

[75] Inventors: Georg Sick, Beilstein; Peter Everwin, Bad Rappenau; Hans H. Duve, Weinsberg, all of Fed. Rep. of Germany

[73] Assignee: Kolbenschmidt Aktiengesellschaft, Neckarsulm, Fed. Rep. of Germany

[21] Appl. No.: 666,296

[22] Filed: Mar. 8, 1991

[30] Foreign Application Priority Data

Mar. 27, 1990 [DE] Fed. Rep. of Germany ....... 4009714

[51] Int. Cl.$^5$ ............ F02F 7/00; F02F 1/00; B32B 15/01; C22C 1/09
[52] U.S. Cl. ................ 123/193.2; 123/668; 29/888.061
[58] Field of Search ............ 123/193 C, 668, 669; 29/888.06, 888.061; 204/26

[56] References Cited

U.S. PATENT DOCUMENTS

| | | | |
|---|---|---|---|
| 3,536,123 | 10/1970 | Izumi | 123/193 C |
| 3,896,009 | 7/1975 | Kobayashi et al. | 123/193 C |
| 3,932,228 | 1/1976 | Sugiyama et al. | 123/193 C |
| 4,739,738 | 4/1988 | Sander et al. | 123/668 |
| 4,757,790 | 7/1988 | Ushio et al. | 123/668 |
| 4,817,578 | 4/1989 | Ushio et al. | 123/193 C |
| 4,986,230 | 1/1991 | Panyard et al. | 123/668 |

FOREIGN PATENT DOCUMENTS 0359111  3/1990  European Pat. Off. ........ 123/193 C

Primary Examiner—E. Rollins Cross
Assistant Examiner—M. Macy
Attorney, Agent, or Firm—Sprung Horn Kramer & Woods

[57] ABSTRACT

In a cast linerless single cylinder or multicylinder block made of an aluminum alloy and intended for use in internal combustion engines, the aluminum matrix contains embedded silicon particles, which protrude from the sliding surface of the cylinder. In order to distinctly reduce the cost of the mechanical machining of the entire surface of the single cylinder or multicylinder block, only the sliding surface of the cylinder is constituted by a fibrous body which contains interspersed silicon particles and infiltrated aluminum alloy.

12 Claims, 1 Drawing Sheet

Fig. 1
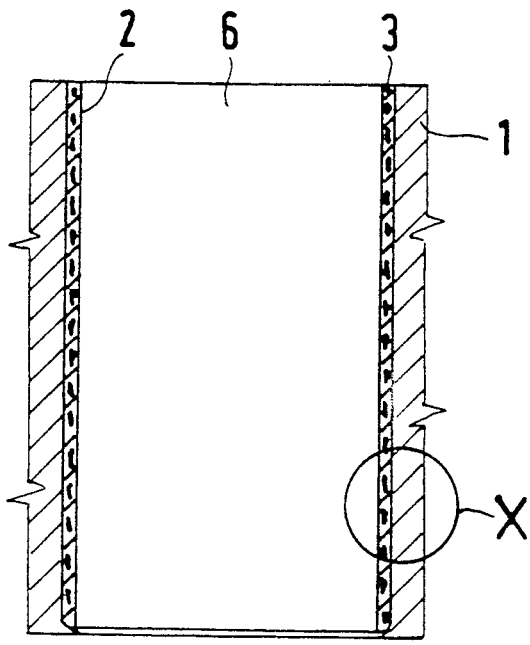
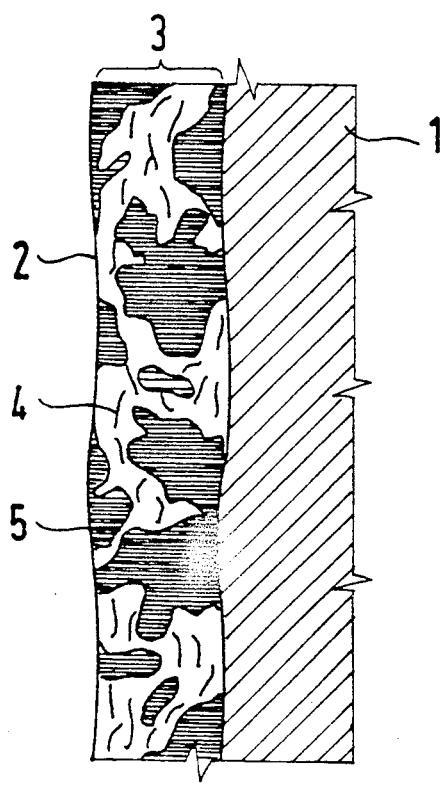
Fig. 2

SINGLE CYLINDER OR MULTICYLINDER BLOCK

DESCRIPTION

This invention relates to a linerless single cylinder or multicylinder block, which is made of an aluminum alloy and has been cast in a metallic permanent mold and is intended for use in internal combustion engines and comprises mechanically smoothened silicon particles which have a size of 20 to 80 μm, preferably 30 to 60 μm, and are embedded and uniformly distributed in the aluminum matrix and protrude 0.5 to 10 μm, preferably 2 to 5 μm, from the sliding surface of the cylinder.

From present-day aspects, aluminum alloys are the most promising materials for use in motor vehicles and their use tends to increase. In addition to other advantages, they are lighter in weight than ferrous materials so that appreciable results will be produced it they are used in the piston and particularly also in single cylinders and multicylinder blocks, which are the heaviest components of a motor vehicle. For instance, a saving by 40 to 60% of weight can be and has been achieved by the use of a multicylinder block made of aluminum alloys rather than grey cast iron in the engine block. In the periodical: MTZ Motortechnische Zeitschrift 35 (1974), pages 33–41, a cylinder is described which is made by low-pressure casting from a hypereutectic aluminum-silicon alloy of the type AlSi17Cu4. A manufacture by pressure casting may also be adopted. The silicon grains which are formed in the sliding surface of the cylinder by a primary precipitation from the hypereutectic aluminum alloy are uniformly distributed and have a uniform shape and have a grain size between 30 and 80 μm. When the single cylinder or multicylinder block has been cast the cylinder bore is mechanically machined by rough boring and finish boring and is rough-honed and finish-honed so that the silicone grain are smoothened and are initially flush with the surrounding aluminum alloy matrix. After the honing operation the aluminum alloy matrix is slightly set back from the silicon grains by an electrochemical treatment so that the silicon grains protrude slightly, i.e., by 2 to 5 μm, from the unreinforced sliding surface of the cylinder to provide a carrying structure for he piston rings and the piston skirt. A cylinder having such a sliding surface can be used only in combination with a light alloy piston which at least on its skirt is coated with an iron layer having a thickness of about 20 μm so that contact between the aluminum alloy matrix of the sliding surface of the cylinder and the light alloy of the piston will be avoided under all circumstances, even under extreme operating conditions. The pressure of the iron coating on the piston skirt will appreciably reduce the wear of the piston skirt and will prevent a seizing action between the piston skirt and the sliding surface of the cylinder. A single cylinder on a multicylinder block of the kind described hereinbefore has the disadvantage that the entire cylinder block has been cast from a hypereutectic primary aluminum alloy produced at high cost. The high silicon content involves a higher wear of the tools used to mechanically machine the cylinder block.

It is also known to make linerless single cylinders and multicylinder blocks of an aluminum alloy of the type AlSi9Cu 3 in a process in which a nickel base layer having a thickness of 50 to 80 μm and containing dispersed silicon carbide particles of 1 to 3 μm is formed by electrodeposition on the surface of the cylinder bore. Thereafter the sliding surface of the cylinder is honed. The silicon carbide particles serve as a carrying structure for the rings and the skirt of the piston. The provision of the nickel dispersion coating involves an appreciable processing cost. Specifically, the electrodepositing plant must be provided with means for detoxifying the pretreating baths. The sludge contained in the spent baths must be collected and must properly be disposed of. Offtakes having built-in scrubbing plants must be installed in the working regions of the coating baths. Besides, expensive handling will be required for regeneration of the cylinder bores in case of repair.

More recently, a multicylinder block for internal combustion engines has been proposed in DE-A-3 725 495 and the sliding surfaces of the cylinders of said block comprise a fiber-reinforced cylindrical portion made of a mixture of alumina-based fibers in a proportion of 8 to 20% by volume and carbon fibers in an amount of 0.3 to 15% by volume in alight alloy matrix, wherein the alumina-based fibers contain up to 25% silica. In a cylinder having such a sliding surface it is still necessary to sue a light alloy piston which is provided on its skirt with an electrodeposited iron layer, which is covered by an also electrodeposited tin layer, so that contact between the aluminum alloy matrix of the multicylinder block and the light alloy piston will be avoided. The hybrid fibers which are embedded in the sliding surface of the cylinder are expensive and the tribological properties under operating conditions are inferior to those of cylinder sliding surfaces made of hypereutectic aluminum-silicon alloys.

It is an object of the present invention to provide a single cylinder or multicylinder block which is of the kind described hereinbefore and which is so designed that it can be made of a hypoeutectic and preferably remelted aluminum alloy, which can be produced at lower cost and which only in the sliding surface of the cylinder has tribological properties that are similar to those of the hypereutectic alloys.

That object is accomplished in that the sliding surface of the cylinder is constituted by a hollow-cylindrical fibrous body, which is made of ceramic fibers and contains interspersed silicon particles and infiltrated hypoeutectic aluminum alloy and is embedded in the cylinder casting. The silicon particles protrude from the sliding surface of the cylinder to form a carrying structure for the piston rings and piston skirt and the fiber content and the proportion of silicon particles are so high that contact between the aluminum alloy matrix of the cylinder and the light alloy piston, which at least on its skirt is coated with an iron layer, will be prevented at least on a large area. On such a sliding surface of the cylinder the same excellent tribological properties can be achieved as in a cast single cylinder or multicylinder block made of hypereutectic primary aluminum alloy of the type AlSi17Cu4Mg and the remaining surfaces of the single cylinder or multicylinder block can be machined at much lower cost.

The fibrous body suitably has a wall thickness of 0.5 to 10 mm, preferably 1.5 to 5 mm.

According to a further feature of the invention the fibrous body has a fiber content of 5 to 30% by volume and a silicon particle content amounting to 30 to 60% by weight of the fiber content.

From the aspect of manufacturing technology the fibers are preferably parallel to the cylinder axis but within the concentric cylindrical surfaces of the fibrous body have a random orientation. However the desired function will by no means be adversely affected if the fibers extend at any desired angles to the cylinder axis. Because the fibrous body serves to retain the silicon particles, the fibers employed need not meet high requirements.

The fibers employed are 2 to 25 μm in diameter and their length-to-diameter ratio is 5 to 25. According to a further feature of the invention it is preferred to use fibers of alumina or aluminum silicate.

According to a further feature of the invention the silicon particles may be replaced entirely or in part by particles of hard substances consisting of silicon carbide and carbides, nitrides and silicides of chromium, tungsten, molybdenum, titanium, niobium, and vanadium, individually or in combination.

In the process of manufacturing the single cylinder or multicylinder block the fibrous body which has been heated to 400° to 600° C. is fitted on the movable core of the casting mold and the molten aluminum alloy at a temperature of 650° to 800° C. is charged into the casting mold and caused to solidify under pressure.

The molten material is preferably caused to solidify under a pressure of at least 30 bars, particularly of 200 to 1000 bars.

Alternatively the molten aluminum alloy may be caused to solidify under a low pressure of 1.2 to 2.0 bars rather than in the pressure casting process.

The fibrous body is desirably made by the so-called vacuum forming process, in which a hollow-cylindrical filter, which is closed at its bottom, is dipped into a suspension of fibers, silicon particles and/or hard substance particles and an organic and/or inorganic binder in an aqueous-alcoholic medium, the liquid if then sucked form the interior of the filter to form on the outside peripheral surface of the filter a nonwoven web consisting of fibers and interspersed particles of silicon and/or hard substances, when the nonwoven web has been removed it is sintered at temperatures of 800° to 1000° C. and is then sufficiently consolidated for being mechanically machined at least on its outside to form a smooth surface. The fibrous body which has thus been pretreated can be fitted on the movable core f the casting mold.

Alternatively, the fibrous body may be made in that the suspensions of fibers, silicon and/or hard substance particles and binder in an aqueous-alcoholic medium is sprayed directly onto the movable core in the thickness of the fibrous body and the molten aluminum alloy at a temperature of 650° to 800° C. is then charged into the casting mold and is caused to solidify under pressure.

The invention is illustrated by way of example in the drawing and will be described in more detail hereinafter.

FIG. 1 is a fragmentary longitudinal sectional view showing one cylinder of a multicylinder block.

FIG. 2 shows the detail X of FIG. 1 magnified 250 times.

The multicylinder block 1 is made of a hypoeutectic aluminum alloy of the type AlSi9Cu3 and has been cast under a pressure of 300 bars. The sliding surfaces 2 of the cylinders are constituted by hollow cylindrical bodies 3, which are embedded in the block casting and have a wall thickness of 3 mm and have been infiltrated by the aluminum alloy and consist of alumina fibers 4 having an average length of 80 μm and a diameter of 5 μm and interspersed silicon particles 5 having a size of 30 to 60 μm. In a polished section the silicon particles cover 12 to 15% of the area. The fiber content amounts to 25% by volume. The fibers are substantially parallel to the axis of the cylinder and within the peripheral surfaces of the cylinders, which surfaces are concentric to the cylinder axes, the fibers have a random orientation. The content of the silicon particles 5 amounts to 40% by weight of the amount of the fibers 4. After the casting operation the cylinder bore 6 is mechanically machined by rough boring and finish boring. Those silicon particles 5 which have been destroyed by the rough and finish boring operations are removed by rough and finish honing. The finish honing is succeeded by a final processing step, which consists of an electrochemical or currentless etching. For instance, electrochemical etching with sodium nitrate removes the aluminum alloy which during the honing operation has been smeared over the silicon particles and the aluminum matrix is slightly set back between the silicon particles, by 3 mm on the average.

It will be understood that the specification and examples are illustrative but not limitative of the present invention and that other embodiments within the spirit and scope of the invention will suggest themselves to those skilled in the art.

What is claimed is:

1. In a linerless cylinder block, which is made of an aluminum alloy and has been cast in a metallic permanent mold and is intended for use in internal combustion engines and comprises mechanically smoothed silicon particles which have a size of 20 to 80 μm and are embedded and uniformly distributed in the aluminum matrix and protrude 0.5 to 10 μm from the sliding surface of the cylinder, the improvement wherein the sliding surface of the cylinder is constituted by a hollow-cylindrical fibrous body (3), which is made of ceramic fibers (4) and contains interspersed particles (5) and infiltrated hypoeutectic aluminum alloy (1) and is embedded in the cylinder casting, the particles (5) being selected from the group consisting of particles of at least one of silicon, silicon carbide; and carbides; nitride and silicides of chromium, tungsten, molybdenum, titanium, niobium and vanadium.

2. A cylinder according to claim 1, wherein the fibrous body (3) has a wall thickness of 0.5 to 10 mm.

3. A cylinder according to claim 1, wherein the fibrous body (3) has a fiber content of 5 to 30% by volume and a silicon particle content amounting to 30 to 60% by 4. A cylinder according to claim 1, wherein the fibers (4) are 2 to 25 μm in diameter and their length-to-diameter ratio is 5 to 25.

5. A cylinder according to claim 1, wherein the fibers (4) consist of alumina or aluminum silicate.

6. A cylinder according to claim 1, wherein the particles (5) include silicon particles.

7. A cylinder according to claim 1, wherein the particles (5) include particles of silicon and particles of at least one member selected form the group consisting of silicon carbide and carbides, nitrides and silicides of chromium, tungsten, molybdenum, titanium, niobium, and vanadium.

8. A cylinder block according to claim 1, wherein the fibrous body is heated to 400° to 600° C. and fitted on a movable core of a casting mold, and the aluminum alloy, now in a molten state, is charged at a temperature of 650° to 800° C. into the casting mold, and solidified under pressure.

9. A cylinder block according to claim 8, wherein the molten aluminum alloy is solidified under a pressure of at least 30 bars.

10. A cylinder block according to claim 8, wherein the molten aluminum alloy is solidified under a pressure of 1.2 to 2 bars.

11. A cylinder block according to claim 8, wherein the fibrous body is made by vacuum forming a hollow-cylindrical filter which is closed at its bottom, dipping said filter into a suspension of fibers, particles (5) and a binder in an aqueous-alcoholic medium, sucking the liquid from the interior of the filter to form on the outside peripheral surface of the filter a nonwoven web consisting of fibers and interspersed particles (5), heating the nonwoven web at a temperature of 800° to 1000° C. and subsequently mechanically machining.

12. A cylinder block according to claim 8, wherein the fibrous body is made by spraying a suspension of fibers, particles (5) and binder in an aqueous-alcoholic medium directly onto a movable core in the thickness of the fibrous body, placing said core into a casting mold, charging the molten aluminum alloy at a temperature of 650° to 800° C. into the casting mold, and solidifying the molten aluminum alloy under pressure.

* * * * *

UNITED STATES PATENT AND TRADEMARK OFFICE
CERTIFICATE OF CORRECTION

PATENT NO. : 5,131,356

DATED : July 21, 1992

INVENTOR(S) : Sick et al.

It is certified that error appears in the above-identified patent and that said Letters Patent is hereby corrected as shown below:

Col. 4, line 49    After " by " insert -- weight of the fiber content --

Signed and Sealed this

Fifteenth Day of March, 1994

Attest:

BRUCE LEHMAN

Attesting Officer    Commissioner of Patents and Trademarks